United States Patent
Jackson et al.

(10) Patent No.: US 6,392,959 B1
(45) Date of Patent: May 21, 2002

(54) CONTACT DATA CORRELATION WITH REASSESSMENT

(75) Inventors: Neil A. Jackson, North Kingstown, RI (US); John T. Williamson, Kailua, HI (US); Francis J. Frantz, Fairfax, VA (US); Patrick B. Ryll, Portsmouth, RI (US); Hyman A. Greenbaum, Westwood, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 08/896,528

(22) Filed: Jul. 7, 1997

(51) Int. Cl.[7] .................................................. G01S 3/80
(52) U.S. Cl. ...................... 367/124; 367/100; 364/516
(58) Field of Search .................... 367/100, 124, 367/131; 364/516

(56) References Cited

U.S. PATENT DOCUMENTS

| | | | | |
|---|---|---|---|---|
| 5,107,271 A | * | 4/1992 | White | 367/98 |
| 5,355,325 A | * | 10/1994 | Uhlmann | 364/516 |
| 5,392,225 A | * | 2/1995 | Ward | 364/516 |
| 5,488,589 A | * | 1/1996 | DeAngelis | 367/131 |
| 5,537,511 A | * | 7/1996 | DeAngelis et al. | 367/124 |

* cited by examiner

Primary Examiner—Ian J. Lobo
(74) Attorney, Agent, or Firm—Michael J. McGowan; Prithvi C. Lall; William F. Eipert

(57) ABSTRACT

A method of processing uncorrelated data from at least one multiple-contact tracking system is provided. The method identifies which of a plurality of contacts being tracked that the uncorrelated data is most likely to be associated with. By combining correlation with reassessment processing, correlation errors can be reduced or minimized. A threshold test (e.g., bearing test) is used to screen or coarsely filter the data while a comparison scoring test is used associate the uncorrelated data with one of the contacts. The same threshold test and comparison scoring test are used for both correlation and reassessment processing.

4 Claims, 3 Drawing Sheets

CONTACT DATA CORRELATION WITH REASSESSMENT

CROSS-REFERENCE TO RELATED PATENT APPLICATIONS

This patent application is co-pending with one related patent application entitled "FUSING CONTACT DATA FOR BEST-ESTIMATE SOLUTION" U.S. patent application Ser. No. 08/896,527. by the same inventors as this patent application.

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to data correlation, and more particularly to correlating contact data generated by multiple-contact tracking systems with one of a plurality of contacts, and reassessing the associations of the contact data with each particular contact.

(2) Description of the Prior Art

A variety of multiple-contact tracking assessment or correlation schemes are known in the art. For example, in U.S. Pat. No. 5,107,271, contact position data is initially processed through a coarse filter. All unrejected data is then passed on to a more stringent nearest-neighbor filter for correlation to a stored contact track. In U.S. Pat. No. 5,355,325, a measurement tree of nodes allows for the correlation between tracks and objects in a multi-contact tracking system. Three-dimensional volume measurements of the objects are correlated to one or more tracks by projecting a contact measurement into three two-dimensional planes. In U.S. Pat. No. 5,392,225, contact data from multiple sensors are correlated to provide a more accurate estimate of contact position. However, none of the prior art provide for reassessment of correlations as a means of verification and error correction. This is especially valuable in scenarios where multiple types of sensors are used to provide incoming data for evaluating a tactical situation. Without effective correlation and fusion of data from multiple types of sensors, a tactical situation "picture" can present conflicting information.

SUMMARY OF THE INVENTION

Accordingly, it is an object of the present invention to provide a method and system for processing uncorrelated contact data in order to identify which of a plurality of contacts the uncorrelated contact data is most likely to be associated.

Another object of the present invention is to provide a method and system for reassessing the correlation of contact data to a particular contact.

Still another object of the present invention is to provide a method and system for reassessing the data associated with the most recently created or updated contact solution in order to see if the most recently created or updated contact solution is correlated with an already existing contact solution.

Other objects and advantages of the present invention will become more obvious hereinafter in the specification and drawings.

In accordance with the present invention, a method of processing uncorrelated data from at least one multiple-contact tracking system is provided. The method identifies which of a plurality of contacts being tracked that the uncorrelated data is most likely to be associated. Reference data is provided that is associated with reference contacts. In accordance with a first application of a threshold test, the uncorrelated data is compared to the reference data associated with each reference contact. In accordance with a first application of a scoring test, the uncorrelated data is compared to the reference data associated with each reference contact passing the first application of the threshold test. A comparison score is generated between the uncorrelated data and each reference contact passing the first application of the threshold test. In accordance with a second application of the threshold test, the uncorrelated data is compared to reference data associated with the one reference contact generating the greatest comparison score during the first application of the scoring test. The uncorrelated data is combined with the reference data associated with the one reference contact generating the greatest comparison score to define an updated reference contact when the second application of the threshold test is passed. However, the uncorrelated data defines a new reference contact when the second application of the threshold test is failed. In accordance with a third application of the threshold test, either the updated reference contact or new reference contact is compared to all the other reference contacts. Then, in accordance with a second application of the scoring test, either the updated reference contact or new reference contact is compared to the reference contacts passing the third application of the threshold test. A comparison score is generated between either the updated reference contact or new reference contact and the reference contacts passing the third application of the threshold test. The uncorrelated data, defining either the updated reference contact or new reference contact, is combined with the reference data associated with the reference contact that has passed the third application of the threshold test and has the greatest comparison score generated by the second application of the scoring test. However, such combining only occurs when the greatest comparison score generated by the second application of the scoring test exceeds a threshold value.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT

Figure 1:
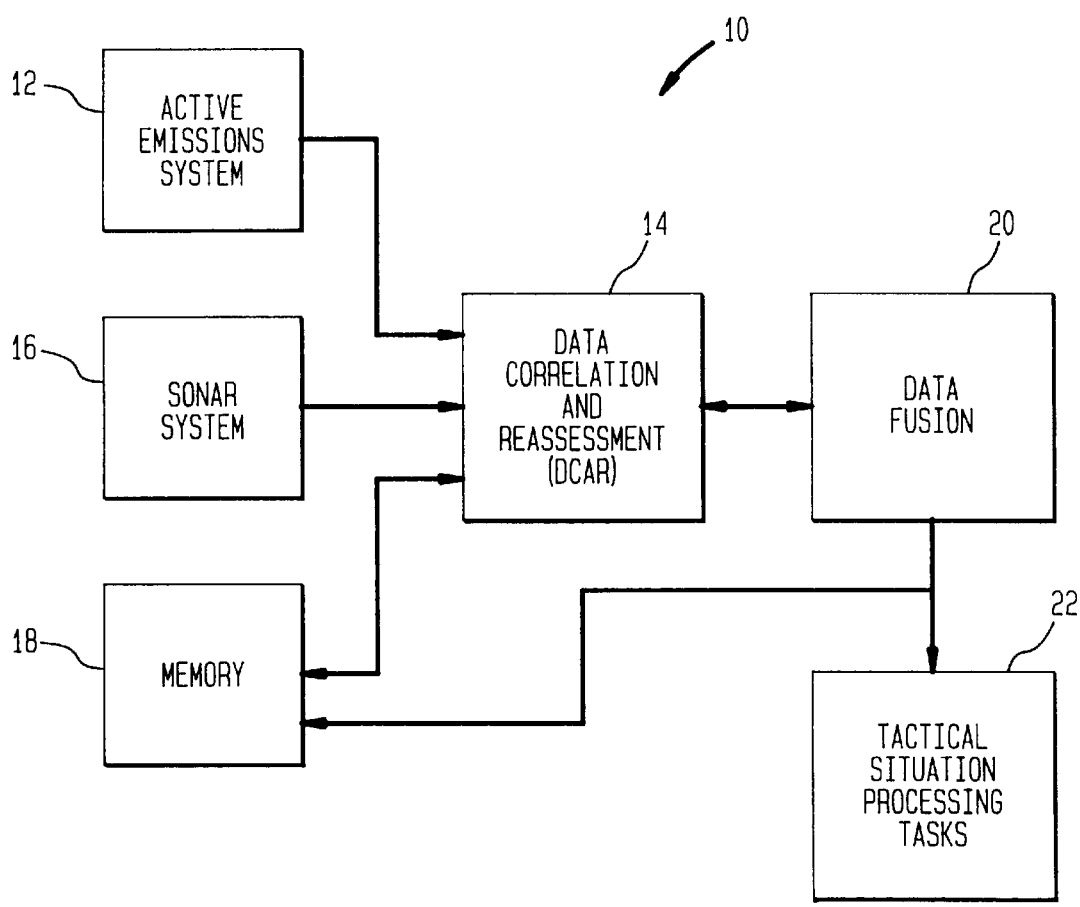
FIG. 1 is a top-level block diagram of the input data processing blocks of an underwater multiple-contact tracking system utilizing the data correlation/reassessment and data fusion modules according to the present invention.

Referring now to the drawings, and more particularly to FIG. 1, a top level block diagram of the input data processing blocks of an underwater multi-contact tracking system is shown and is referenced generally by the numeral 10.

However, while the present invention will be described relative to underwater tracking, it is to be understood that the novel features of the invention are applicable to any multi-event scenario where multiple systems provide independently measured/generated uncorrelated data concerning the event.

Input data processing blocks provide data or contact solutions (e.g., bearing and/or range-to-contact) on various contacts (not shown) being tracked. For example, an active emissions (AE) system 12 senses and interprets various emissions (e.g., noise) from each contact being tracked. One such AE system utilized by the U.S. Navy is the AN/WLY-1 system. If possible, AE system 12 assigns an AE contact number to the emissions and outputs both the AE data and assigned contact number to a data correlation and reassessment (DCAR) module 14 for storage in memory 18. Input data processing also includes a sonar system 16 that collects and interprets various sonar data on the contacts being tracked. Similar to AE system 12, sonar system 16 assigns a contact number to the sonar sensor data and outputs both to DCAR module 14 for storage in memory 18. Examples of sonar systems include the U.S. Navy's AN/BQQ-5, AN/BQQ-6, AN/BSY-1 and AN/BSY-2 systems. Additional systems could be used to provide even more data (correlated and uncorrelated) on the contacts being tracked. If AE system 12 or sonar system 16 are unable to assign a contact number to the data, DCAR module 14 operates to identify which contact the uncorrelated data is most likely to be associated with as will be explained in detail below. As part of the correlation process, DCAR module 14 performs novel reassessment processing to correct for correlation errors and take advantage of contact updates brought about by the various contact-data collection systems. Each contact having data assigned thereto is referred to hereinafter as a reference contact having a contact identity and data associated therewith stored in memory 18.

In addition to undergoing correlation and reassessment processing performed by DCAR module 14, each reference contact is also processed periodically (e.g., once per second) by a data fusion module 20 which, as will be described further below, performs a variety of tasks. In general, the goal of these tasks is to merge or fuse data from the multiple sensor data sets for each reference contact in order to establish a fused reference contact file stored in memory 18 for use by DCAR module 14 and by other tactical situation processing tasks 22. The complex process of data fusion takes into account sensor system capabilities from a signal excess and parameter coverage perspective. Based on sensor capability and signal excess, a parameter tolerance is derived and used in a parameter reconciliation process. A parameter smoothing process is applied to mitigate bad data and large deviations in order to prevent same from causing a ripple error effect through the processing chain.

Data correlation at DCAR module 14 is performed each time new (uncorrelated) data is received in order to decide with which reference contact the data is associated with or if a new reference contact should be created. The correlation process in the present invention is, broadly speaking, a three-part process. First, point-to-track correlation examines each new sensor data block ("point") to see whether it is associated with one of the existing reference contacts ("track") stored in memory 18 or whether a new reference contact should be created. Next, a first reassessment procedure, referred to herein as track-to-track decorrelation, is performed in which the updated reference contact is examined to see whether the sensor data blocks identified therewith should be separated into different reference contact designations. Finally, a second reassessment procedure, referred to herein as track-to-track correlation, is performed to determine whether any two of the reference contacts are actually the same reference contact.

Figure 2:
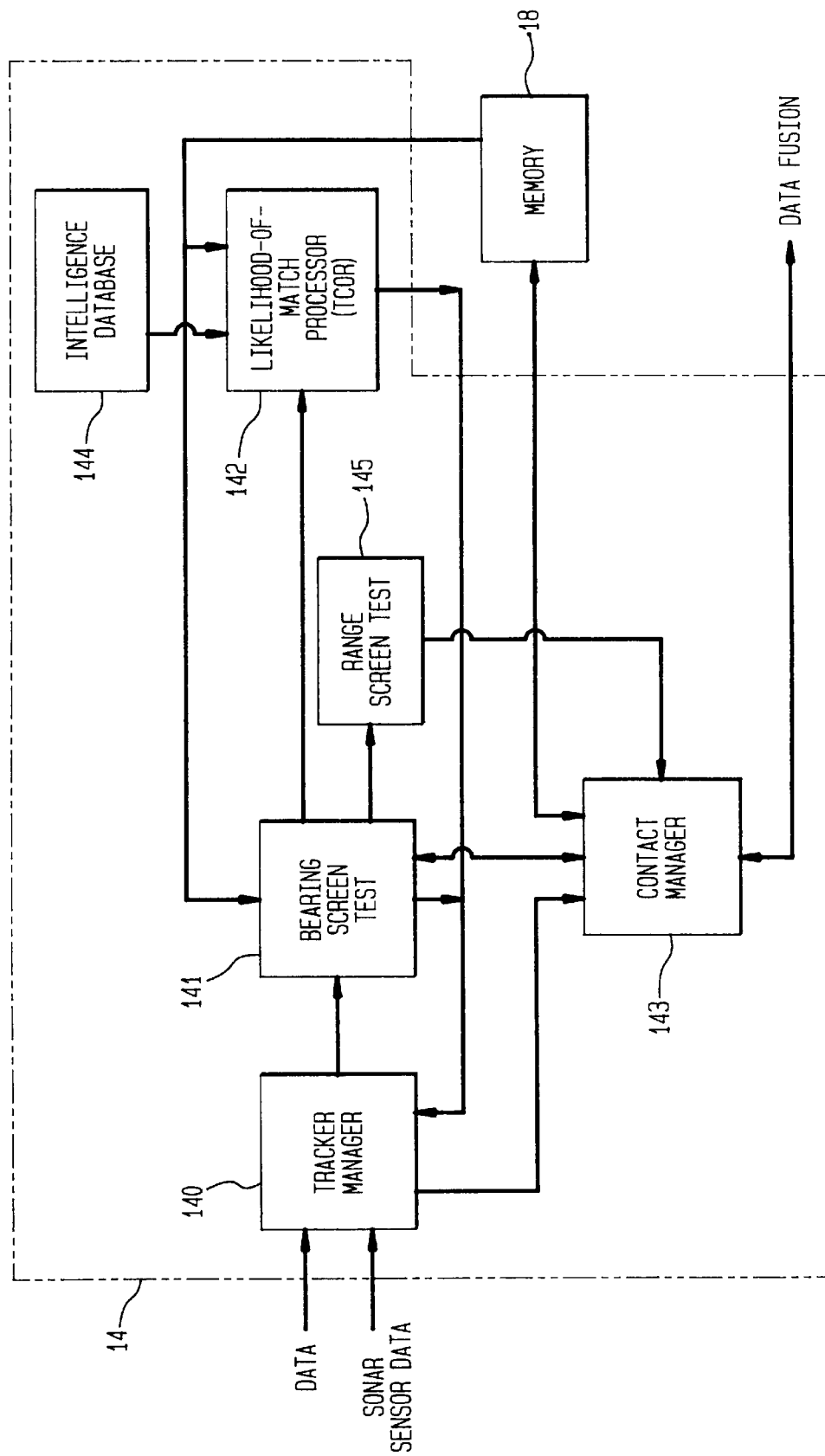
FIG. 2 is a functional block diagram of the data correlation module.

In FIG. 2, a functional block diagram of DCAR module 14 is depicted. Incoming sonar data and AE data is received by a tracker manager 140 which maintains a history of such data. As mentioned above, if either type of data is already identified by a contact number that exists in the set of reference contacts, then the incoming data is correlated with the corresponding reference contact. However, if the incoming data block is not identified with a contact number (i.e., the data is uncorrelated), tracker manager 140 performs point-to-track correlation in the following manner. Tracker manager 140 first supplies the uncorrelated data to a bearing screen test processor 141 to reduce the number of reference contacts against which the incoming (uncorrelated) data must be evaluated for possible association. A test on bearing is used because both AE data and sonar data will include at least bearing-to-contact information.

One such bearing screen test that can be used in the present invention will now be described by way of example. Let $B_1$=tracker bearing, $\sigma_1$=standard deviation of tracker bearing, $B_2$=reference contact bearing (time corrected to the tracker bearing time), and $\sigma_2$=standard deviation of reference contact bearing.

Further, let $$S_1 = B_1 - 3\sigma_1,$$

$$S_u = B_1 + 3\sigma_1,$$

$$T_1 = B_2 - 3\sigma_2,$$

and $$T_u = B_2 + 3\sigma_2,$$

be the 3-sigma lower and upper bounds on $B_1$ and $B_2$ defining the threshold criteria for the bearing screen test.

Applying the above in an example where the tracker and reference contact bearing source are colocated (i.e., the sensors are the same or colocated), the bearing screen test is as follows:

If $|S_1 - S_u| > 180°$, then convert $S_1$, $S_u$, $T_1$, $T_u$ to be between $-180°$ and $+180°$.

And, if $$[S_1 \leq T_1 \leq S_u],$$

or $$[S_1 \leq T_u \leq S_u],$$

or $$[T_1 < S_1 \text{ and } T_u > S_u \text{ and } |T_1 - T_u| < 180°],$$

then the reference contact passes the bearing screen test.

For the situation where the tracker and reference contact bearing source are not colocated, the angle θ between tracker sensor position and reference contact bearing sensor position must be accounted for where $$\theta = \arctan\left(\frac{x_{track} - x_{con}}{y_{track} - y_{con}}\right)$$

and where ($x_{trunk}$, $y_{truck}$) is the tracker's position, and ($x_{con}$, $y_{con}$) is the time-corrected reference contact bearing source position. Then, let $S_1' = S_1 - \theta$, $S_u' = S_u - \theta$, $T_1' = T_1 - \theta$, and $T_u' = T_u - \theta$.

The bearing screen test is passed when:

$S_1' \leq 180° < S_u'$, and $|S_1' - S_u'| < 180°$,      1)

or $T_1'' \leq 0° \leq T_u''$ and $|T_1'' - T_u''| < 180°$      2)

where $T_1'' = T_1'$ mod(−180° to 180°)

and $T_u'' = T_u'$ mod(−180° to 180°), or $S_u < 180°$ and $T_1' < S_u'$,      3)

or $S_1' > 180°$ and $T_u' > S_1'$.      4)

Each reference contact having a bearing that is within the (3-sigma) threshold criteria is used in the next step of the point-to-track correlation. Each comparison falling outside the threshold criteria causes the associated reference contact to be dropped from further point-to-track correlation processing.

Reference contacts passing the bearing screen test are evaluated in a more exhaustive manner by a likelihood-of-match processor 142 that applies a total correlation algorithm to each such reference contact. Likelihood-of-match processor 142 computes a score based upon a comparison of the incoming (uncorrelated) data block and the data identified with each reference contact passing the bearing screen test performed by processor 141. The incoming data is then correlated to the reference contact that achieves the highest score. A contact manager 143 updates the reference contact (using the incoming data) and stores the updated reference contact in memory 18.

The total correlation (TCOR) computation used by processor 142 utilizes both geometric data (i.e., bearing, bearing rate, range, range rate, and depression/elevation angle) and classification data maintained in an intelligence data base 144. Such TCOR computations are in use by the U.S. Navy in a variety of applications and are therefore well understood in the art. In the present invention, for each type of data existing for both the incoming data block and the reference contact being compared, TCOR computes a score. A positive score favors correlation of the incoming data block with the reference contact to which it is being compared, while a negative score favors non-correlation. For each type of data, there is a maximum allowed score and a threshold for which the maximum score is applied. For example, a maximum score of 10 could be given if the incoming data bearing and reference contact bearing are within a small deviation (e.g., a ¼ sigma threshold) after adjustment for sensor position and time. Other deviation thresholds are used to determine non-correlation or neutral correlation scores. Each type of geometric data has its own thresholds and minimum/maximum scores. The present invention can also include classification data comparisons (according to comparison methods known in the art) that are based on spectral consistency and classification types. These values can be adjusted based on available data in order to optimize performance of the TCOR computation.

The TCOR computation is based on a comparison of several parameters (depending on availability for both the incoming data block and the reference contact) and can include bearing, bearing rate, range, range rate, depression/elevation angle, passive narrow band (PNB) tonals, emitted frequency correspondence to radiated frequencies, and classification. For the given incoming data block and reference contact the TCOR computation resembles that used in other Navy applications. Briefly, $$TCOR = 70 + GCOR + SCOR + ACOR + CCOR \quad (1)$$

where GCOR is the geometric correlation coefficient, SCOR is the signature correlation coefficient, ACOR is the AE correlation coefficient, and CCOR is the classification correlation coefficient. The constant "70" is an arbitrary number selected as a threshold level passing score.

If the incoming data block indicates a new track (i.e., is not currently correlated with a reference contact), it will be correlated with the reference contact which yields the highest TCOR value provided TCOR ≥ 70. Otherwise, a new reference contact will be created. If the incoming data block is already associated with a reference contact by means of an assigned contact number from either AE system 12 or sonar system 16, it can again be correlated with that reference contact. However, the threshold level passing score is slightly reduced, e.g., to 60, to prevent unwanted decorrelation when contact numbers have already been assigned.

Determination of GCOR will be explained below by way of example with respect to bearing data. A similar determination can be made using range data. The reference contact bearing is time-corrected using the reference contact bearing rate and acceleration (if it is available). Otherwise, the bearing will be used as is but the bearing standard deviation will be increased (e.g., at a rate of 10°/minute up to a maximum of 10°) to the time of the tracker bearing. More specifically, let $B$ = reference contact bearing (tracker time) = reference contact bearing (previous time) + ($\Delta T \times B_{RATE}$)

where $\Delta T$ = tracker time − contact recorded time, and $B_{RATE}$ = reference contact bearing rate.

Note that if the reference contact bearing is from a towed array, the tracker bearing is from a hull array, and the reference contact has a range associated with it, then the towed array reference contact bearing must be parallax corrected as is known in the art.

To perform the bearing comparison, the scoring function given below will be used, $$L(B) = 18.12 - 7.391(\ln(\sigma_{bres}) + bres^2/2\sigma_{bres}^2) \quad (2)$$

where bres=bearing residual=reference contact bearing−tracker bearing,
$$\sigma_{bres}=\sqrt{\sigma_{Btracker}^2+\sigma_{Bref}^2}$$

where $\sigma_{Bref}$=standard deviation of reference contact bearing, and $\sigma_{Btracker}$=standard deviation of tracker bearing.

In addition, L(B) is clipped so as not to exceed −10 or +10. This is done to prevent an error from having an unrealistic effect on the scoring function and to prevent one term (e.g., GCOR, SCOR, etc.) from skewing the overall TCOR score. If a bearing comparison cannot be performed L(B)=0.

The above scoring function in equation (2) is derived from the likelihood function (ie., the population density function of the residual)

$$P(bres) = \frac{1}{\sqrt{2\pi}\,\sigma_{bres}} \exp(-bres^2/2\sigma_{bres}^2) \quad (3)$$

and the log likelihood function $$\ln(p)=-\ln(\sqrt{2\pi})-\ln(\sigma_{bres})-bres^2/2\sigma_{bres}^2 \quad (4)$$

A linear combination L(B) of ln(p) is then found which satisfies acceptable boundary conditions, e.g., for $\sigma_{bres}$=3° and bres=0°, L(B)=10; and for $\sigma_{bres}$=3° and bres=1.645$\sigma_{bres}$, L(B)=0, thereby yielding equation (2). Similar scoring functions L($B_{RATE}$), L(R), L($R_{RATE}$) and L(D/E) are used for bearing rate, range, range rate and depression/elevation angle, respectively. The value of GCOR is then determined from the sum of all the above scoring functions.

Determination of SCOR is based on the PNB tonals associated with the reference contact and incoming data block. The PNB tonals originate either from the same sensors/band or from sensors with overlapping bands with the tonals in the overlap being compared to determine SCOR. The scoring function, L(PNB), also has a permissible range, e.g., between −7 and +10. To perform this scoring, the fraction of correctly matched and unmatched tonals is determined. That is, if N=number of matched overlapping tonal bands and M=number of tonal bands left unmatched=(number in tracker−N)+(number in reference−N), then the scoring function is given by $$SCOR = L(PNB) = 10 \times \left(\frac{N - \max(O, M - N_E)}{\max(N + M, DMIN)}\right) \quad (5)$$

where DMIN=minimum allowable denominator which is used to keep scores lower with fewer lines, and $N_E$=number of extraneous (unmatched) lines to discount before affecting scoring.

Determination of ACOR is based on a comparison of the PNB tonals of either the incoming data block or reference contact with tonals maintained in intelligence data base 144. ACOR is then given a value of, for example, 0 for no matches, +3 for 1 tonal match, and +6 for 2 or more tonal matches.

CCOR is obtained from a comparison of the reference contact classification with the incoming data block classification. If the reference contact of the incoming data block contains multiple classifications, each classification of the reference contact is compared with each classification from the incoming data block. The comparison which results in the highest value is then utilized to obtain CCOR. If the reference contact classification is from the same sonar tracker as the incoming data block processed, CCOR=0. If the reference contact classification is from a different sonar tracker than the one being processed, the CCOR value is assigned is accordance with a predetermined correlation score between the values of −10 and +10.

Upon update of a reference contact with the data from the incoming data block, contact manager 143 applies a track-to-track decorrelation in order to reassess the newly updated reference contact. This is a form of error checking to verify whether two just-correlated contact "tracks" should remain correlated. (If only one data block or stream is associated with the reference contact, e.g, as is the case with a newly created reference contact, track-to-track decorrelation is not performed.)

Track-to-track decorrelation is performed in the following manner. The incoming data used to update a reference contact is compared with each of the other data blocks already associated with that reference contact. Each such comparison begins with a check of the classification of the incoming data used to update the reference contact and each of the other data blocks already associated with the reference contact. If there is an incompatibility between the classification of the incoming data block used to update the reference contact and that of one of the other data blocks already associated with the reference contact, the two data blocks are decorrelated into two reference contacts by contact manager 143. If the classifications agree, contact manager 143 submits the same two data blocks to bearing screen test processor 141 (which operates as described above). If the bearing screen test is failed, i.e., the threshold tolerance is exceeded, contact manager 143 decorrelates the two data blocks into two reference contacts. Finally, if range and range rate are available in each of the two data blocks, a range screen test is applied by range screen test processor 145. The range screen test algorithm used in the present invention is the same as the above-described bearing screen test except that the range data and their standard deviations are used in place of the bearing data/standard deviations. If the range screen test is failed, contact manager 143 decorrelates the two data blocks into two reference contacts.

Following any track-to-track decorrelation processing, contact manager 143 performs track-to-track correlation as another level of error checking. Track-to-track correlation is used to determine if an updated (or newly created) reference contact is actually one of the other existing reference contacts. As a first step, contact manager 143 submits the updated (or newly created) reference contact and each of the existing reference contacts to bearing screen test processor 141 (which operates as described above). If one or more of the existing reference contacts is within the given bearing threshold, a second track-to-track correlation step is performed. In the second step, likelihood-of-match processor 142 computes total correlation scores (using the above-described TCOR algorithm) between the updated (or newly created) reference contact and those of the existing reference contacts passing the most recent bearing screen test application. Contact manager 143 then uses the updated (or newly created) reference contact to update the existing reference contact that i) passes this most recent bearing screen test application, ii) achieves a TCOR threshold value (e.g., a value of 70 in the illustrated example), and iii) achieves the highest TCOR score. If the TCOR threshold is not met by any of the existing reference contacts passing this most recent bearing screen test application, no further update takes place.

Figure 3:
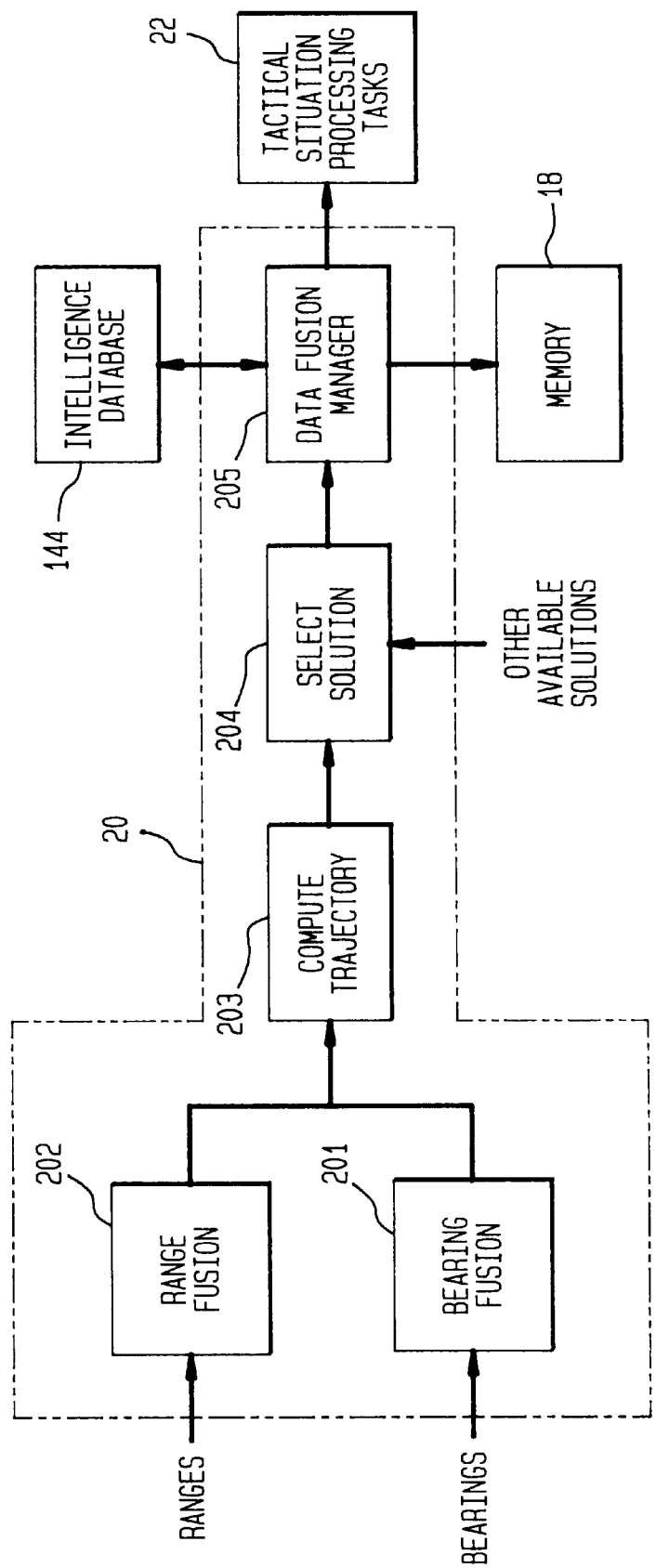
FIG. 3 is a functional block diagram of the data fusion module.

Referring again to FIG. 1, each reference contact maintained by contact manager 143 in memory 18 is processed periodically by data fusion module 20 which is depicted as a functional block diagram in FIG. 3. The goal of data fusion module 20 is to generate the best quality data possible for each reference contact. The data fusion process consists of several functional blocks to include a bearing fusion block 201, a range fusion block 202, a compute trajectory block 203, a select solution block 204 and a data fusion manager block 205.

Bearing fusion block 201 periodically receives bearing data associated with a reference contact from contact manager 143. The bearing data originates from a plurality of independently operating trackers (e.g., sensor systems such as AE system 12 and sonar system 16). Bearing fusion block 201 applies a linear or quadratic weighted least squares fit to each tracker's bearing data over a given time span (e.g. up to 30 bearings over a two-minute time span). While the linear fit function is useful for short range or high (bearing) noise applications, the quadratic fit function is a more general solution. A weighted least squares fit technique was selected over an unweighted technique so that better bearing data would be used and aberration bearing data would be filtered out. Accordingly, the following description will focus on a quadratic weighted least squares fit technique.

The quadratic weighted least squares fit is performed as follows. Let $b_i$=i-th bearing, $t_i$=time of i-th bearing, and $w_i$=weight of i-th bearing.

Then, the coefficients A, B, C of the quadratic equation $$b(t)=At^2+Bt+C$$

are found which minimize the sum $$\Sigma w_i(b_i-b(t_i))^2$$

where b(t) represents the fitted bearing at time t. The equation for b(t) is used to estimate a weighted-average bearing at the current time, as well as the bearing rate and bearing acceleration, and the standard deviations of the bearing and bearing rate. This estimation is performed for each tracker which has been assigned to a reference contact. The tracker providing the lowest standard deviation of the bearing data is considered to be the best tracker. The best tracker is thus selected to provide the bearing parameters for each reference contact used by compute trajectory block 203 in further processing. Since the bearing data sets are evaluated periodically by bearing fusion block 201, the "best tracker" selection is a dynamic process that adapts to changing conditions.

Range fusion block 202 receives range data for each reference contact from contact manager 143 and processes the data in parallel with bearing fusion block 201. Range fusion block 202 performs a quadratic weighted least squares fit to the range data using an algorithm similar to that used by bearing fusion block 201. For example, up to 30 ranges (over a maximum of two minutes) could be processed at a time. However, there is no restriction that the ranges be associated with a single tracker. A weighted-average range, range rate, range acceleration, standard deviation of range, and standard deviation of range rate are computed. These computed parameters are then provided to compute trajectory block 203 for further processing.

Compute trajectory block 203 utilizes the range and range rate provided by range fusion block 202 and the bearing and bearing rate provided by the tracker selected at bearing fusion block 201 to generate a solution for the reference contact. The solution computed includes the course (heading) and speed of the reference contact. This solution is then sent to select solution block 204.

The computed solution is a standard "x equations with x unknowns" problem where

R=range (known from range fusion);

$R_{RATE}$=range rate (known from range fusion);

B=bearing (known from bearing fusion);

$B_{RATE}$=bearing rate (known from bearing fusion);

$V_{OSx}$=ownship east velocity (known from a ship system); and $V_{OSy}$=ownship north velocity (known from a ship system).

Given the above the computed solution can be determined as $V_{tx}$=contact east velocity=$V_{OSx}$+$R_{RATE}$ sin(B)+$RB_{RATE}$ cos(B);

$V_{ty}$=contact north velocity=$V_{OSy}$+$R_{RATE}$ cos(B)−$RB_{RATE}$ sin(B);

$C_t$=contact course=arc tan ($V_{tx}/V_{ty}$); and $S_t$=contact speed=$\sqrt{V_{tx}^2+V_{ty}^2}$.

Select solution block 204 selects one of several available solutions for the reference contact. Each such available solution is independently generated or made available from several subsystems, e.g., the solution provided by compute trajectory block 203, a solution provided by active emissions system 12, a solution provided by sonar system 16, etc. More specifically, select solution block 204 uses the bearing data from the best tracker (as determined by bearing fusion block 201) to compute the root mean square (RMS) bearing error for each available solution. The solution with the minimum RMS error over a given time period is then selected as the contact solution for that reference contact. The solution is provided to data fusion manager 205.

Data fusion manager 205 builds the fused contact data files containing the best current estimates of contact parameters. These files include both geometric solution data and attribute data such as classification. Data fusion manager 205 uses geometric data provided by bearing fusion block 201, range fusion block 202, and select solution 204. Data fusion manager 205 also receives or assigns confidences to classification data in order to reconcile any conflicts in classification. Thus, data fusion manager 205 has access to intelligence database 144 to aid in the reconciliation process. The fused data files for each reference contact are stored in memory 18. The fused data files contain all of the geometric and attribute data that is believed to best represent the current tactical situation for use by DCAR module 14 and tactical situation processing tasks 22.

The advantages of the present invention are numerous. By combining correlation with reassessment processing, correlation errors can be reduced or minimized. Data fusion can be used to pick the best solution from a variety of independent solution-generating sources to provide the clearest tactical "picture" possible.

By way of illustrative example, the present invention has been described relative to a particular application thereof. However, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of processing uncorrelated data from at least one multiple-contact tracking system, said method identifying which of a plurality of contacts being tracked the uncorrelated data is most likely to be associated with, said method comprising the steps of:

providing reference data associated with reference contacts included in said plurality of contacts;

comparing, in accordance with a first application of a bearing screen test, the uncorrelated data to said reference data associated with each of said reference contacts;

comparing, in accordance with a first application of a total correlation test, the uncorrelated data to said reference data associated with first passing reference contacts to generate a comparison score between the uncorrelated data and each of said first passing reference contacts, the first passing reference contacts being a subset of the reference contacts passing said first application of said bearing screen test; comparing, in accordance with a second application of said bearing screen test, the uncorrelated data to reference data associated with one of said first passing reference contacts generating the greatest said comparison score during said first application of said total correlation test, wherein the uncorrelated data is combined with said reference data associated with said one of said first passing reference contacts generating the greatest said comparison score to define an updated reference contact when said second application of said bearing screen test is passed, and wherein the uncorrelated data defines a new reference contact when said second application of said bearing screen test is failed;

comparing, in accordance with a third application of said bearing screen test, one of said updated reference contact and said new reference contact to said reference contacts; and comparing, in accordance with a second application of said total correlation test, said one of said updated reference contact and said new reference contact to second passing reference contacts to generate a comparison score between said one of said updated reference contact and said new reference contact and said second passing reference contacts, said second passing reference contacts being a subset of said reference contacts passing said third application of said bearing screen test, wherein the uncorrelated data defining said one of said updated reference contact and said new reference contact is combined with said reference data associated with one of said third passing reference contacts having the greatest said comparison score generated by said second application of said total correlation test when the greatest said comparison score generated by said second application of said total correlation test exceeds a threshold value.

2. A method according to claim 1 wherein the uncorrelated data and said reference data include bearing-to-contact data, and wherein said first application, said second application and said third application of said bearing screen test comprise the step of applying an identical threshold criteria when comparing said bearing-to-contact data of the uncorrelated data to said bearing-to-contact data of said reference data.

3. A method according to claim 2 wherein said identical threshold criteria is a 3-sigma threshold criteria.

4. A method of processing uncorrelated data from at least one multiple-contact tracking system to identify which of a plurality of reference contacts being tracked the uncorrelated data is most likely to be associated with, the uncorrelated data including a bearing-to-contact parameter, said method comprising the steps of:

providing a contact solution for each of said plurality of reference contacts to include at least a bearing therefor;

assessing the uncorrelated data with said reference data for each of said plurality of reference contacts by performing a bearing screening threshold comparison between said bearing-to-contact parameter with each said bearing, and by performing a plurality of detail comparisons between like parameters of the uncorrelated data and said contact solution for each of said plurality of reference contacts passing said bearing screening threshold comparison to generate a score, wherein the uncorrelated data is correlated to said contact solution and is used to update said contact solution for one of said plurality of reference contacts that i) passes said bearing screening threshold comparison, ii) generates the highest said score, and iii) has said score above a threshold value, and wherein the uncorrelated data is considered to identify a new reference contact having a new contact solution when said score does not achieve each said threshold value;

reassessing the uncorrelated data with said contact solution for said one of said plurality of contacts by performing a second application of said bearing screening threshold comparison therebetween wherein the uncorrelated data remains correlated with said contact solution for said one of said plurality of reference contacts when said second application of said bearing screening threshold comparison is passed; and reassessing one of said new contact solution and said contact solution so updated with the uncorrelated data by performing a third application of said bearing screening threshold comparison between said bearing-to-contact parameter with each said bearing, and by performing another plurality of said detail comparisons between like parameters of the uncorrelated data and said contact solution for each of said plurality of reference contacts passing said third application of said bearing screening threshold comparison to generate another score, wherein the uncorrelated data is correlated to and is used to update said contact solution for one of said plurality of reference contacts that i) passes said third application of said bearing screening threshold comparison, ii) generates the highest said another score, and iii) has another said score above said threshold value, and wherein the uncorrelated data is considered to identify a new reference contact having a new contact solution when each said another score does not achieve said threshold value.

* * * * *